Feb. 25, 1969 K. SIEBERTZ 3,430,111

TRANSISTOR DEVICE

Original Filed June 28, 1962

INVENTOR.
KARL SIEBERTZ

BY Spiee & Spiel ATTORNEYS

1

3,430,111
TRANSISTOR DEVICE

Karl Siebertz, Munich-Obermenzing, Germany, assignor to Siemens Aktiengesellschaft, Munich, Germany, a corporation of Germany Original application June 28, 1962, Ser. No. 206,557, now Patent No. 3,264,715, dated Aug. 9, 1966. Divided and this application Apr. 22, 1966, Ser. No. 555,640
U.S. Cl. 317—234 1 Claim
Int. Cl. H01l 3/10

ABSTRACT OF THE DISCLOSURE

A transistor having a base plate forming part of a housing, a first conductor extending through said base plate, a pair of second conductors laterally spaced from said first conductor extending through said base plate parallel to said first conductor, a component rectilinearly attached to said first conductor extending therefrom, parallel thereto, having a semiconductor element secured to it and carrying two electrodes facing the said second conductors, prongs extending from the said second conductors, means for connecting the prongs with the said second conductors and means for connecting the said electrodes to the said prongs.

The invention disclosed herein is concerned with a semiconductor component, especially a mesa transistor. This application is a division of application Ser. No. 206,557, filed June 28, 1962.

The invention is particularly applicable to semiconductor arrangements with very small geometrical dimensions, especially arrangements having closely adjacent positioned electrodes, and the object of the invention is to simplify the contacting of such arrangements and the placement thereof in housings, and primarily to avoid to a far reaching extent complicated and costly individual operation.

The invention contemplates the following important steps, namely, placing a strip of semiconductor material, which is provided with a plurality of pairs of adjacently positioned electrodes, upon the prongs of a comb-like carrier with the strip extending perpendicularly to said prongs, connecting contacting wires respectively with each electrode and the free ends of the parts of the prongs which are not covered by the semiconductor strip, thereupon severing the prongs from the remaining part of the carrier, subdividing the semiconductor strip between the prongs, mounting the resulting individual semiconductor systems upon the base plate of a housing, and thereupon mutually separating the individual electrodes by cutting the carrier.

The method according to the invention makes it possible to place upon a carrier, without resorting to microscopic observation, a semiconductor body for a plurality of systems, so that only one adjusting operation is required for a great number of systems. The contacting, for example, with the aid of thermocompression bonding, is likewise carried out upon the common carrier and can thus be effected at readily manipulated units. The individual systems can be mutually separated in very simple manner, after completing the contacting. The electrical separation of the individual electrodes is effected by cutting the carrier, after the mounting of the system on the base plate of a housing, and the connections with respect to the lead through conductors can accordingly likewise be readily achieved, thereby also considerably simplifying the corresponding assembly operations.

2

The comb-like carrier is made of a material, especially a metal having a thermal coefficient of expansion which corresponds sufficiently to that of the semiconductor strips, for example, nickel, tungsten or an alloy known under the trade name Vacon, which is an iron-nickel-cobalt alloy having a composition of 28% nickel, 18% cobalt and 54% iron, in which the cobalt content may vary somewhat with a corresponding variation in the iron content. The semiconductor strip is secured to the prongs of the carrier, for example, by welding or by alloying it thereto. The semiconductor strip may consist of a material of one conduction type, that is, p-, n- or i-conduction. It may, however, also have one or more junctions between zones of different conductivity type and/or different conductance, extending perpendicularly to the narrow side thereof. Moreover, the carrier may consist of a metal, or may be coated with a metal, at the place at which the semiconductor strip is positioned, which metal effects upon alloying the semiconductor strip thereto, a doping, for example, an overdoping or change of doping, of the parts of the semiconductor strip which are adjacent to the carrier.

The semiconductor strip is provided with electrodes which are alloyed thereinto, prior to securing it to the carrier, after or with formation of a pn-, pi-, ni-, $pp^+$- and/or nn-junction.

The contacting wires are connected with the electrodes and the free ends of the prongs of the carrier lying ahead of the semiconductor strip, after such strip is secured on the carrier. Such contacting may be effected, for example, by thermocompression bonding. This is in known manner done with a punch terminating in a knife edge, which is at elevated temperature pressed against the point which is to be contacted.

It is in connection with practicing the present method of advantage to use a punch terminating in a knife edge, which is of a configuration such that several and especially all electrodes lying in a row, or all places upon the carrier which are to be contacted, are simultaneously connected with the contacting wire. Accordingly, it is possible to use, for example, a punch having an edge with a length corresponding to that of the semiconductor strip, so that such edge engages simultaneously all electrodes or all points of the carrier which are to be contacted.

The individual prongs of the carrier are, after the contacting operation, separated from the remaining part of the carrier, by a cut extending in parallel to the semiconductor strip, and the semiconductor strip is subdivided by cuts extending between the prongs, thus resulting in individual contacted systems. The parts of the carrier remaining on the respective semiconductor bodies, that is, the individual prongs, can be bent in desired manner and thereupon mounted upon the base plate of a housing.

After connecting the respective carrier prongs with the lead through conductors of the housing, serving as current leads, the individual electrodes are electrically separated by cutting out parts of the corresponding prong. In case the semiconductor system has, upon the side facing away from the carrier, only one electrode, as is for example the case with a diode, it will suffice to remove a part of the respective prong which lies between the semiconductor body and the contacting point which is disposed upon the carrier prong. However, in case the individual semiconductor system has, upon the side thereof which faces away from the carrier prong, a plurality of electrodes lying side by side, the prong must be subdivided by cuts extending between the contact points thereon, to form a number of strips corresponding to the number of electrodes. This subdividing can be effected after the contacting operations but before covering the prongs from the remaining part of the carrier, and also after effecting the above described connections with the lead through conductors of the housing. It is, however, particularly advantageous to use from the outset a carrier in which the free ends of the prongs, which are not covered by the semiconductor strip, are in their longitudinal direction at least partially subdivided into a plurality of strips corresponding in number to the number of these electrodes.

Details of the invention will now be described with reference to the accompanying drawing showing a particularly advantageous embodiment thereof.

Figure 3:
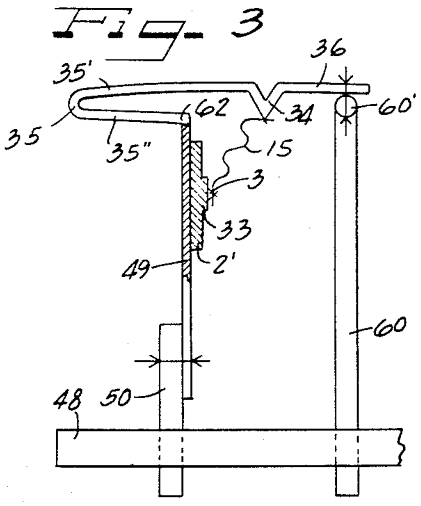
Figure 4:
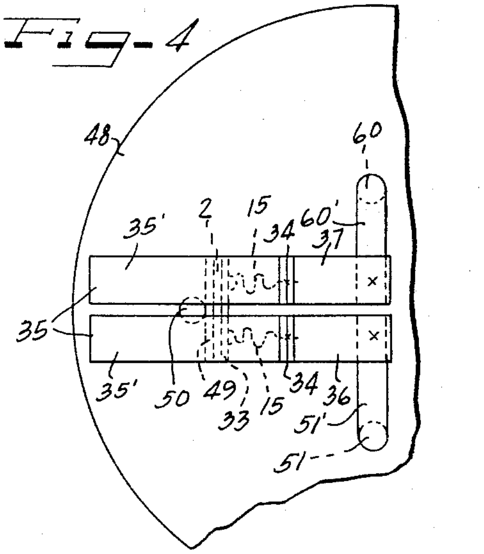

FIG. 3 indicates in side view an example of a system mounted upon the base plate of a housing; and FIG. 4 shows a plan view of the arrangement indicated in FIG. 3.

The embodiment illustrated in the drawing in concerned with the contacting and the mounting of mesa transistors. Such transistors have two closely adjacently positioned electrodes which are spaced apart by only a few microns, said electrodes being provided upon a protuberance of the semiconductor body which is referred to as mesa. This protuberance is upon the side facing the semiconductor body provided with a thin duffsion layer which has a conduction type opposite to that of the remaining semiconductor body. Into this diffusion layer is alloyed the emitter electrode, the formation of a p-n junction, and the base electrode, with formation of a barrier-free contact. The part of the semiconductor body which lies opposite to the electrodes is provided with a collector terminal.

Figures 1, 2:
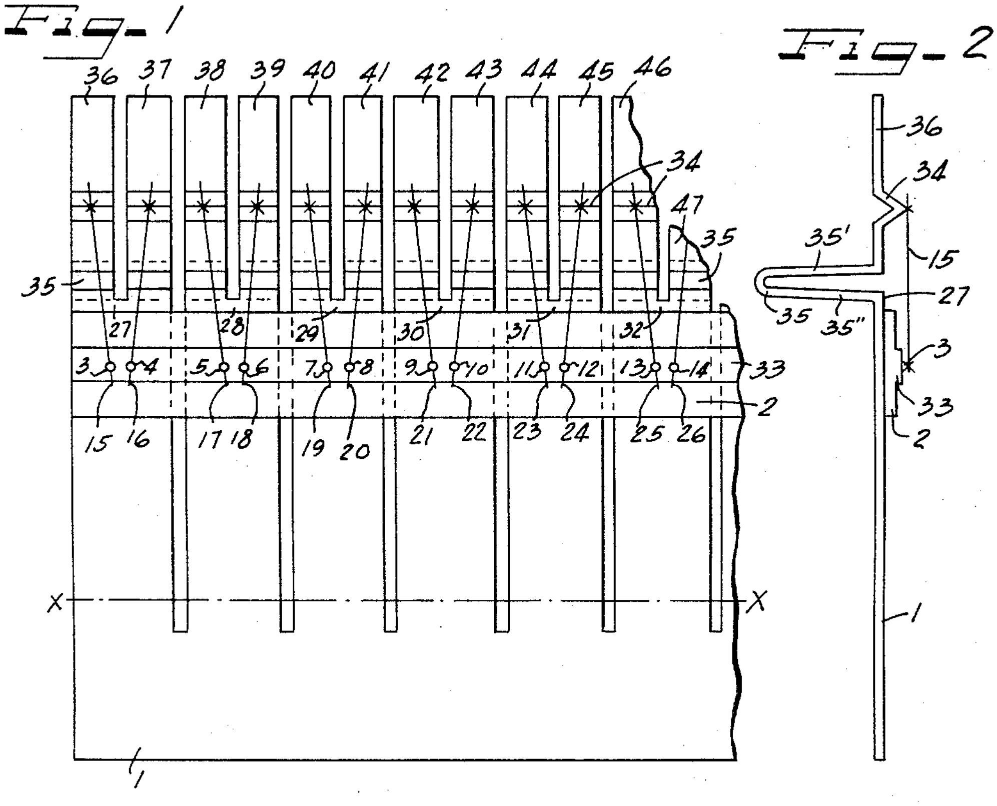
FIG. 1 is an elevational view of part of a comb-like carrier and semiconductor parts secured thereto and contacted in accordance with the invention.
FIG. 2 shows an end view of the structure.

In FIG. 1, numeral 1 designates the comb-like carrier which has a thickness amounting to a few tenths millimeter. Upon this carrier is provided the semiconductor strip 2, made, for example, of germanium, silicon, silicon carbide or an $A^{III}B^{IV}$-compound, such strip extending perpendicularly with respect to the prongs 27 to 32 of the carrier, the parts of the prongs which are not covered by the semiconductor strip being of approximately the same length. The semiconductor strip has a number of mesa protuberances corresponding to the number of prongs, the respective protuberances being provided with pairs of closely adjacently positioned electrodes 3, 4 . . . 13, 14, respectively, representing emitter and base electrodes. The carrier as such forms the collector terminal.

The free ends of the carrier prongs which lie ahead of the semiconductor strip 2 are at least in part longitudinally subdivided to form respectively two strips 36, 37 . . . 46, 47. As noted before, the electrodes and the free ends of the prongs are interconnected by means of contacting wires indicated at 15–26, which is done with the aid of thermocompressing bonding. The contacting points upon the free ends of the prongs are indicated in FIG. 1 by *x* marks. Each of the strips 36–47 is provided with a contact point lying opposite to the corresponding electrode.

The free ends of the carrier have in this embodiment a particularly favorable shape which is apparent from FIG. 2. The free ends of the prongs are, on the side thereof on which is placed the semiconductor strip, provided with a pointed extension 34 which simplifies the contacting of the corresponding point of the carrier with a wire.

The prongs of the carrier are advantageously provided each with a loop 35 disposed between the contacting points and the semiconductor strip and extending away from the plane of the carrier. The loops are formed, after subdividing the prongs, on the side facing away from the semiconductor body, into strips such as 36, 37, corresponding in number to the number of electrodes such as electrodes 3, 4, by bending respective prongs so that each loop is at least partially likewise subdivided into strips. At least one arm 35′, 35″ of the respective loops is thus separated by a cut, making it in very simple manner possible to separate the individual electrodes electrically after the respective individual systems are mounted upon the base plate of a housing. In the event that the respective loops are not completely subdivided into strips, such separation must of course be completed, since each strip forms an electrical terminal for an electrode. FIG. 2 also shows a mesa protuberance 33 provided upon the semiconductor strip 2.

The prongs of the carrier are after the contacting operation separated from the remaining part of the carrier along a line X—X indicated in FIG. 1. The individual contacted systems are obtained by cutting the semiconductor strip 2 along planes extending between the prongs. It is in this manner possible to prepare at the same time a great number of individual systems, for example, twenty systems.

The individual system which is in this manner obtained is still readily manipulated, and after the corresponding prong is bent in desired manner, can be mounted upon the base plate of a housing and connected with lead through conductors serving as current leads.

FIG. 3 shows an example of such a system mounted upon the base plate 48 of a housing (not shown). The prong 49 is bent so that the narrow side of the semiconductor body 2′ extends approximately in parallel with the base plate 48 when the end thereof, which forms the collector terminal, is connected with the lead through conductor 50. The other end of the prong is, as shown in FIG. 4, subdivided into two finger-like strips 36, 37, which are respectively connected with the emitter and base lead through conductors 51 and 60. It will also be seen from this figure that the upper ends of the lead through conductors 60 and 51 are bent at right angles to the axis thereof and that the strips 36, 37 are connected with the corresponding angularly bent parts 60′ and 51′. The individual electrodes are electrically separated from one another by cutting the parts 35′ and 35″ apart. The point at which is effected the cutting apart of the loop is not critical in the illustrated example, in which the loop 35 is up to the bend 62 (FIG. 3) subdivided into two strips.

After completing the assembly of parts as described above, the arrangement may be covered in known and suitable manner by a cap attached in vacuumtight manner to the base plate 48.

Changes may be made within the scope and spirit of the appended claim which defines what is believed to be new and desired to have protected by Letters Patent.

I claim:

1. A mesa transistor comprising:

a base plate forming part of a housing, a first lead through conductor projecting through said base plate substantially perpendicularly thereto, a pair of second lead through conductors spaced from said first conductor projecting through said base plate in substantially parallel relation with said first conductor, a component comprising a strip having a rectilinearly extending part secured to said first conductor and extending therefrom in parallel relationship thereto, a semiconductor element secured to said rectilinearly extending part, said semiconductor element carrying two closely spaced apart electrodes facing substantially in the direction of the said second conductors, two prongs extending at substantially right angles to the pair of said second conductors, means for connecting the said prongs with the said second conductors, and means for interconnecting the respective electrodes each with one of said prongs.

References Cited

UNITED STATES PATENTS

| | | | |
|---|---|---|---|
| 3,215,907 | 10/1965 | Fogarty | 317—234 |
| 3,296,503 | 1/1967 | Klossika | 317—234 |
| 3,248,471 | 4/1966 | Danchuck | 174—15 |

JOHN W. HUCKERT, *Primary Examiner.*

M. EDLOW, *Assistant Examiner.*